(12) United States Patent
Phani et al.

(10) Patent No.: US 6,696,514 B1
(45) Date of Patent: Feb. 24, 2004

(54) PROCESS USEFUL FOR MAKING IN-SITU SILICON CARBIDE IN THE FORM OF PARTICULATE, WHISKERS AND FIBRES IN AN INORGANIC COMPOSITE MATRIX

(75) Inventors: Kalyan Kumar Phani, West Bengal (IN); Asok Kumar De, West Bengal (IN); Nripati Ranjan Bose, West Bengal (IN); Sankar Ghatak, West Bengal (IN)

(73) Assignee: Council of Scientific & Industrial Research, New Delhi (IN)

( * ) Notice: Subject to any disclaimer, the term of this patent is extended or adjusted under 35 U.S.C. 154(b) by 47 days.

(21) Appl. No.: 10/323,117

(22) Filed: Dec. 19, 2002

Related U.S. Application Data

(62) Division of application No. 09/781,199, filed on Feb. 22, 2001, now Pat. No. 6,548,586.

(51) Int. Cl.$^7$ ................................................. C08K 3/34
(52) U.S. Cl. ........................ 524/442; 523/324; 523/345; 501/88
(58) Field of Search .................. 524/442; 423/345, 423/324; 501/88

(56) References Cited

U.S. PATENT DOCUMENTS

| | | |
|---|---|---|
| 5,037,626 A | 8/1991 | Ho et al. |
| 5,096,858 A | 3/1992 | Das Chaklader et al. |
| 5,298,467 A | 3/1994 | Hurtado et al. |
| 5,455,212 A | 10/1995 | Das Chaklader et al. |
| 5,654,094 A | 8/1997 | Patel et al. |
| 6,398,991 B1 | 6/2002 | Brazil et al. |

*Primary Examiner*—Edward J. Cain
*Assistant Examiner*—Katarzyna Wyrozebski Lee
(74) *Attorney, Agent, or Firm*—Schweitzer Cornman Gross & Bondell LLP

(57) ABSTRACT

A process for making in-situ carbide in the form of particulate, whiskers and fibres in an inorganic composite matrix, which comprises, dissolving 38 to 73.5 Wt % of phenolic resin in an organic solvent to obtain a phenolic resin solution, adding 4.2–11.0 Wt %—of a curing agent optionally adding 9.4–12 Wt % of silicon carbide powder to obtain a resin mix followed by impregnating 1.6–6.5 Wt % of natural fibre with the said resin mix dried at 60°–70° C. for a period in the range of 1–5 hrs. to obtain a dough in the form of a composite plate sheet, drying the said composite plate or sheet at a temperature in the range of 70°–90° C. for a time period in the range of 1–2 hrs., drying the composite plate or sheet, heat treating the dried composite plate or sheet at a temperature in the range of —150°–200° C. for a period in the range of 1–2.5 hrs., impregnating the resultant composite plate or sheet with 10.4–42 Wt % tetraethyl orthosilicate in vacuum, subjecting the impregnated composite plate/sheet to heat treatment in absence of air initially at a heating rate in the range of 2°–5° C. per minute up to a temperature in the range of 200°–400° C. followed by further heating at the rate of 10°–15° C. per minute up to a temperature in the range of 1400° C.–1850° C., maintaining the final temperature for a period in the range of 0.5–2 hrs.

4 Claims, No Drawings

PROCESS USEFUL FOR MAKING IN-SITU SILICON CARBIDE IN THE FORM OF PARTICULATE, WHISKERS AND FIBRES IN AN INORGANIC COMPOSITE MATRIX

RELATED APPLICATIONS

This application is a division of our application Ser. No. 09/781,199, filed Feb. 22, 2001 now U.S. Pat. No. 6,548,586.

FIELD OF THE INVENTION

The present invention relates to a process for making in-situ Silicon Carbide in the form of particulate, whiskers and fibers in an inorganic composite matrix.

The process of the present invention particularly relates to the use of wide variety of natural fibres such as jute, hem, sisal or any other natural fibre having cellulosic or hemicellulosic fibre as its backbone as raw materials for providing useful carbon for the formation of silicon carbide in the form of particulate, whiskers and fibres in an inorganic composite matrix selected from Silicon Carbide-carbon and carbon matrix.

The main usage of the silicon carbide particulate, whiskers, fibre in Silicon Carbide-carbon or carbon composite matrix is in the field of engineering materials in any shape as may be deemed fit.

BACKGROUND OF THE INVENTION

The present day method of making Silicon Carbide particulate, whisker and fibre reinforced composite in Silicon Carbide-carbon matrix or carbon matrix essentially consists of seeding graphite substrate with metal droplets such as Fe, Co, Cr and Mn as catalyst for the whisker formation. Methane and silicon monoxide supply C and Si respectively—the references for which may be made to "Synthesis and Characterization of VLS—Derived Sic whiskers" of P. D. Shaiek in Conf. Whisker and Fibre Toughened Ceramics, Oak Ridge T N (1988) and to "Review of VLS Sic Whisker Growth Technology" by W. E. Holler and J. J. Kim in Ceram. Engg. Sci. Proc., vol. 12, pp979–991 (1991) or making fibre by melt extrusion and suspension spinning of compositions of ultrafine SiC powders and organic additives such as polyvinyl butyral respectively followed by sintering or making fibre by melt spinning polymers which can be rapidly cured in the solid state and polymerised to ceramic fibres with compositions which are stoichiometric silicon carbide or which are carbon-rich or silicon-rich silicon carbide the reference for which may be made to "Silicon Carbide: from Acheson's Invention to New Industrial Products" by W. D. G. Boecker in cfi/Ber. DKG74, (5), 1997. The fibres and whiskers produced by the above processes are mixed mechanically with the matrix material and are fabricated into different sizes and shapes followed by heat treatment at different temperatures for consolidations the references for which may be made to "Pressureless Sintering of $Al_2O_3$./SiC Materials: Effect of the "Reducing Atmosphere" by G. Urretavizcaya, J. M. Porto Lopez & A. L. Cavalieri, J. Eu. Ceram. Soc. 17 1555–63 (1997). In a process inorganic polymers that are ceramic precursors are spun into fibres by melt-spinning or solvent—assisted dry spinning, stabilising the fibres to prevent remelting followed by thermally decomposing into fibres, the references for which may be made to German P.2,618150; French P.2,308,590; Japanese P.51 130325, 51 139929, 51 147623 (1976). In slurry spinning a dispersion of crystalline ceramic particulate in a carrier fluid is formed into a fibre, converted to fibre by thermal conversion by several heating stages that may include passing the fibre through a flame. The process generates particulate of not more than 1 um to control shrinkage the references for which may be made to E.I. du Pont de Nemovrs and Co. B. P. 1,264,973 (1972); U.S. Pat. No. 3,808,015 (1974); U.S. Pat. No. 4,753,904 (1988), Mitsul Minie Co. Ltd. Japanese P 217182. (1986); European P. 0,206,868—A2 (1988), U.S. Pat. No. 4,812 271 (1989).

The overall process has several drawbacks that may be listed below:
1. Number of steps involved in the overall process is higher.
2. Handling of whiskers and short fibres require special arrangements.
3. It is difficult to disperse whiskers and short fibres uniformly in the matrix.
4. Silicon Carbide whiskers particularly of aspect ratio less than 10 cause health hazard.

A principal object of the present invention is to provide a process for making in-situ silicon carbide in the form of particulate, whiskers and fibres in an inorganic composite matrix selected from Silicon Carbide carbon and carbon matrix composite which obviates the drawbacks as detailed above.

Yet another object of the present invention is to utilise natural fibres of plant source.

Still another object of the present invention is to reduce the total number of unit processes in the overall operation.

Yet another object of the present invention is to form whiskers and fibres in-situ during processing to eliminate totally the possibility of health hazard.

DETAILED DESCRIPTION OF THE INVENTION

Accordingly the present invention provides a process and composition useful for making in-situ silicon carbide in the form of particulate, whiskers and fibres in an inorganic composite matrix selected from silicon carbide carbon and carbon composite matrix, wherein the said composition comprises:

| | |
|---|---|
| Natural Fibre | 1.6–6.5 Wt % |
| TetraEthyl Orthosilicate | 10.4–42 Wt % |
| Phenolic Resin | 38–73.5 Wt % |
| Curing agent | 4.2–11 Wt % |
| Silicon Carbide (optional) | 9.4–12 Wt % |
| Organic Solvent | requisite amount to dissolve Phenolic resin |

In an embodiment of the present invention the inorganic composite matrix such as a silicon carbide-carbon composite matrix further comprises:

| | |
|---|---|
| Natural Fibre | 1.6–6.4 Wt % |
| TetraEthyl Orthosilicate | 10.4–42 Wt % |
| Phenolic Resin | 38–46 Wt % |
| Curing agent | 4.2–6.6 Wt % |
| Silicon Carbide | 9.4–12.4 Wt % |
| Organic Solvent | requisite amount to dissolve Phenolic resin |

In yet another embodiment the inorganic composite matrix such as a carbon composite matrix further comprises:

| Natural Fibre | 2.5–6.5 Wt % |
| --- | --- |
| TetraEthyl Orthosilicate | 13.4–40 Wt % |
| Phenolic Resin | 46–73.5 Wt % |
| Organic Solvent | requisite amount to dissolve Phenolic resin |

In yet another embodiment the fibre used is a natural fibre selected from the group consisting of jute, sisal, hem and any other natural fibre having cellulosic or hemicellulosic constituent at its backbone.

In yet another embodiment the curing agent used is selected from hexamine, para toluenesulphonic acid and para formaldehyde most preferably hexamine.

In yet another embodiment the molecular weight of phenolic resin used is in the range of 450–700.

In still another embodiment the organic solvent used is selected from methanol, toluene and benzene.

In another embodiment, the present invention provides a process for making in-situ carbide in the form of particulate, whiskers and fibres in an inorganic composite matrix, which comprises, dissolving 38 to 73.5 Wt % of phenolic resin in -an organic solvent to obtain a phenolic resing solution, adding 4.2–11.0 Wt % of a curing agent optionally adding 9.4–12 Wt % of silicon carbide powder to obtain a resin—mix followed by impregnating 1.66.5 wt % of natural fibre-with the said resin mix dried at 60°–70° C. for a period in the range of 1–5 hrs. to obtain a dough in the form of a composite plate sheet, drying the said composite plate or sheet at a temperature in the range of 70°–90° C. for a time period in the range of 1–2 hrs., drying the composite plate or sheet, heat treating the dried composite plate or sheet at a temperature in the range of 150°–200° C. for a period in the range of 1–2.5 hrs., impregnating the resultant composite plate or sheet with 10.4–42 Wt % tetraethyl orthosilicate in vacuum, subjecting the impregnated composite plate/sheet to heat treatment in absence of air initially at a heating rate in the range of 2°–5° C. per minute up to a temperature in the range of 200°–400° C. followed by further heating at the rate of 10°–15° C. per minute up to a temperature in the range of 1400° C.–1850° C., maintaining the final temperature for a period in the range of 0.5–2 hrs.

In yet another embodiment the natural fibre introduced in the body in desired alignment is selected from unidirectional, multidirectional, woven, and randomly oriented structure.

In yet another embodiment the matrix material used is of different particle dimension ranging from nano to micron size.

In still another embodiment the heat treatment is done in an inert atmosphere or in vacuum.

In another embodiment the composition is useful for making in situ silicon carbide in the form of particulate, whiskers and fibres in an inorganic matrix selected from silicon carbide-carbon and carbon composite matrix.

SUMMARY OF THIS INVENTION

The process of the present invention can be used to produce in-situ silicon carbide in the form of particulate, whiskers and fibres in an inorganic composite selected from Silicon Carbide-carbon and carbon composite matrix of various shapes and sizes required for application as engineering components. Natural fibres of plant origin contain all the ingredients of forming silicon carbide if sufficient amount of silicon is provided. Organo silicon compounds such as ethyl silicates give active silica on pyrolysis. This active silica inturn reacts with carbon formed from cellulosic materials like fibres of plant origin. Silicon carbide thus formed is in molecular dimension and with proper catalyst and seeding crystals, unidirectional grain growth occurs to form long fibres of small diameters or whiskers of different aspect ratios. Isolated silicon carbide grains may grow in the three dimensions resulting in particulate formation. If this complex set of network structures is allowed to grow in an inorganic composite matrix selected from Silicon Carbide carbon and carbon matrix the resulting microstructure consists of randomly orientated fibres and whiskers in a homogeneous matrix leading to enhanced fracture toughness imparting some machinability in otherwise non-machinable material.

The following examples are given way of illustration of the present invention and should not be construed to limit the scope of the present invention.

EXAMPLE—1

38 gms. of phenolic resin of molecular weight 525 is dissolved in 95 ml. of methanol, 4.2 gms. of hexamine is added to it and stirred. 9.4 gms. of silicon carbide powder is then blended in this solution. 1.6 gms. Jute fibre is dried at 60° C. for 5 hrs. and is mixed with the above mixture and formed into a composite plate. The composite plate is dried at a temperature of 80° C. for 1 hr. followed by curing at a temperature of 160° C. for 2 hrs. The plate is then impregnated with 46.8 ml. of tetraethyl orthosilicate under vacuum. The vacuum impregnation step is repeated for 5 cycles. The material so obtained is heat treated in argon at the rate of 2° C. per min. up to 400° C. followed by heating in argon at 1400° C. at the rate of 10° C. per min, for 1 hr.

EXAMPLE—2

39 gms. of phenolic resin of molecular weight 475 is dissolved in 97 ml. of toluene. 4.3 gms. of-hexamine is added to it and stirred. 9.6 gms. of silicon carbide powder is then blended in this solution. 2 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 45.1 ml. tetraethyl orthosilicate under vacuum. The vacuum impregnation step is repeated for 5 cycles. The material so obtained is heat treated in argon at the rate of 3° C. per min. up to 400° C. followed by heating in argon at 1500° C. at the rate of 12° C. per min. for 1.5 hrs.

EXAMPLE—3

40 gms. of phenolic resin of molecular weight 550 is dissolved in 100 ml. of methanol. 4.3 gms. of hexamine is added to it and stirred. 9.8 gms. of silicon carbide powder is then blended in this solution. 2.5 ms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 1 70° C. for 2 hrs. The sheet is then impregnated with 43.4 ml. tetraethyl orthosilicate under vacuum. The vacuum impregnation step is repeated for 5 cycles. The material so obtained is heat treated in argon at the rate of 3° C. per min; up to 400° C. followed by heating in argon at 1600° C. at the rate of 12° C. per min. for 1.5 hrs.

EXAMPLE—4

41 gms. of phenolic resin of molecular weight 600 is dissolved in 102 ml. of benzene. 4.5 gms. of hexamine is added to it and stirred. 10 gms. of silicon carbide powder is then blended in this solution. 3 gms Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 41.5 ml. tetraethyl orthosilicate under vacuum. The vacuum impregnation step is repeated for 5 cycles. The material so obtained is heat treated in argon at the rate of 3° C. per min. for 1.5 hrs.

EXAMPLE—5

41. gms of phenolic resin of molecular weight 600 is dissolved in 102 ml. of benzene. 4.5 gms. of hexamine is added to it and stirred. 10 gms. of silicon carbide powder is then blended in. this solution. 3 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 41.5 ml. tetraethyl orthosilicate under vacuum. The vacuum impregnation step is repeated for 5 cycles. The material so obtained is heat treated in argon at the rate of 3° C. per min. up to 400° C. followed by heating in argon at 1650° C. at the rate of 130° C. per min. for 1.5 hrs.

EXAMPLE—6

42 gms. of phenolic resin of molecular weight 675 is dissolved in 105 ml. of toluene. 5 gms. of hexamine is added to it and stirred. 11 gms. of silicon carbide powder is then blended in this solution. 3.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 38.5 ml. tetraethyl orthosilicate under vacuum. The vacuum impregnation step is repeated for 5 cycles. The material so obtained is heat treated in argon at the rate of 4° C. per min. up to 400° C. followed by heating in argon at 1700° C. at the rate of 13° C. per min. for 1.5 hrs.

EXAMPLE—7

43 gms. of phenolic resin of molecular weight 650 is dissolved in 107 ml. of methanol. 5 gms. of hexamine is added to it and stirred. 11.5 gms. of silicon carbide powder is then blended in this solution. 4 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 36.5 ml. tetraethyl orthosilicate under vacuum. The vacuum impregnation step is repeated for 5 cycles. The material so obtained in heat treated in argon at the rate of 4° C. per min. up to 400° C. followed by heating in argon at 1750° C. at the rate of 14° C. per min. for 1.5 hrs.

EXAMPLE—8

44 gms. of phenolic resin of molecular weight 700 is dissolved in 110 ml. of toluene. 5 gms. of hexamine is added to it and stirred. 12 gms. of silicon carbide powder is then blended in this solution. 4.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at temperature of 170° C. for 2 hrs. The sheet is then impregnated with 34.5 ml, tetraethyl orthosilicate under vacuum. The vacuum impregnation step is repeated for cycles. The material so obtained is heat treated in argon at the rate of 4° C. per min. for 1.5 hrs.

EXAMPLE—9

46 gms. of phenolic resin of molecular weight 450 is dissolved in 115 ml. of benzene. 6.6 gms. of hexamine is added to it and stirred. 12.4 gms. of silicon carbide powder is then blended in this solution. 6.4 gms. Jute fibre is dried at 62° C. for 4 hrs. and is mixed with the above mixture and formed into a dough. This dough is then pressed into a composite plate. This composite plate is dried at a temperature of 75° C. for 2 hrs. followed by curing at a temperature of 170° C. for 2 hrs. The plate is then impregnated with 28.6 ml. tetraethyl orthosilicate under vacuum. The vacuum impregnation step is repeated with 28.6 ml. tetraethyl orthosilicate under vacuum. The vacuum impregnation step is repeated for 5 cycles. The material so obtained is heat treated in argon at the rate of 3° per min. up to 400° C. followed by heating in argon at 1850° C. at the rate of 15° C. per min. for 2 hrs.

EXAMPLE—10

42 gms. of phenolic resin of molecular weight 450 is dissolved in 100 ml. of methanol. 6.2 gms. of hexamine is added to it and stirred. 1.6 gms. Jute fibre is dried at 60° C. for 5 hrs. and is mixed with the above mixture and formed into a composite plate. The composite plate is dried at a temperature of 80° C. for 1 hr. followed by curing at a temperature of 160° C. for 2 hrs. The plate is then impregnated with 50.2 ml. of tetraethyl orthosilicate under vacuum. The vacuum impregnation step is repeated for 5 cycles. The material so obtained is heat treated in argon at the rate of 2° C. per min. up to 400° C. followed by heating in argon at 1400° C. at the rate of 10° C. per min. for 1 hr.

EXAMPLE—11

43 gms. of phenolic resin of molecular weight 600 is dissolved in 102 ml. of toluene. 6.3 gms. of hexamine is added to it and stirred. 2 gms. Jute fibre is dried at 62° C. for 4 hrs. and is mixed with the above mixture and formed into a dough. This dough is then pressed into a composite plate. This composite plate is dried at a temperature of 75° C. for 2 hrs. followed by curing at a temperature of 170° C. for 2 hrs. The plate is then impregnated with 48.7 ml. tetraethyl orthosilicate under vacuum. The vacuum impregnation step is repeated for 5 cycles. The material so obtained is heat treated in argon at the rate of 3° C. per min. up to 400° C. followed by heating in argon at 1500° C. at the rate of 12° C. per min. for 1.5 hrs.

EXAMPLE—12

44 gms. of phenolic resin of molecular weight 700 is dissolved in 102 ml. of methanol. 6.3 gms. of hexamine is added to it and stirred. 2.5 gms. Jute fibre is dried at 62° C. for 4 hrs. and is mixed with the above mixture and formed into a dough. This dough is then pressed into a composite plate. This composite plate is dried at a temperature of 75°

C. for 2 hrs. followed by curing at a temperature of 170° C. for 2 hrs. The plate is then impregnated with 47.2 ml. tetraethyl orthosilicate under vacuum. The vacuum impregnation step is repeated for 5 cycles. The material so obtained is heat treated in argon at the rate of 3° C. per min. up to 400° C. followed by heating in argon at 1600° C. at the rate of 12° C. per min. for 1.5 hrs.

EXAMPLE—13

46 gms. of phenolic resin of molecular weight 550 is dissolved in 105 ml. of benzene 6.5 gms. of hexamine is added to it and stirred. 3 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 44.5 ml. tetraethyl orthosilicate under vacuum. The vacuum impregnation step is repeated for 5 cycles. The material so obtained is heat treated in argon at the rate of 3° C. per min. up to 400° C. followed by heating in argon at 1650° C. at the rate of 13° C. per min. for 1.5 hrs.

EXAMPLE—14

47 gms. of phenolic resin of molecular weight 650 is dissolved in 105 ml. of toluene. 7 gms. of hexamine is added to-it and stirred. 3.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 42.5 ml. tetraethyl orthosilicate under vacuum. The vacuum impregnation step is repeated for 5 cycles. The material so obtained is heat treated in argon at the rate of 4° C. per min. up to 400° C. followed by heating in argon at 1700° C. at the rate of 13° C. per min. for 1.5 hrs.

EXAMPLE—15

48 gms. of phenolic resin of molecular weight 475 is dissolved in 108 ml. of methanol. 7 gms. of hexamine is added to it and stirred. 4 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 41 ml tetraethyl orthosilicate under vacuum. The vacuum impregnation step is repeated for 5 cycles. The material so obtained is heat treated in argon at the rate of 4° C. per min. up to 400° C. followed by heating in argon at 1750° C. at the rate of 14° C. per min. for 1.5 hrs.

EXAMPLE—16

49 gms. of phenolic resin of molecular weight 675 is dissolved in 110 ml. of toluene. 7 gms. of hexamine is added to it and stirred. 4.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 39.5 ml. tetraethyl orthosilicate under vacuum. The vacuum impregnation step is repeated for 5 cycles. The material so obtained is heat treated in argon at the rate of 4° C. per min. up to 400° C. followed by heating in argon at 1800° C. at the rate of 14° C. per min. for 1.5 hrs.

EXAMPLE—17

52 gms. of phenolic resin of molecular weight 525 is dissolved in 115 ml. of benzene. 8.6 gms. of hexamine is added to it and stirred. 6.4 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 33 ml. tetraethyl orthosilicate under vacuum. The vacuum impregnation step is repeated for 5 cycles. The material so obtained is heat treated in argon at the rate of 3° C. per min. up to 400° C. followed by heating in argon at 1850° C. at the rate of 15° C. per min. for 2 hrs.

EXAMPLE—18

3 gms of phenolic resin is mixed with 5 gms of methanol and 1.125 gms of hexamine and stirred. Jute fibre is dried at 60° C. for 1 hr. and is impregnated with the above solution and formed into a composite plate. The composite plate is dried at a temperature of 80° C. followed by curing at a temperature of 160° C. for 2 hrs. The plate is then impregnated with ethyl orthosilicate under vacuum. The vacuum impregnation step is repeated for 5 cycles. The material so obtained is heat treated in argon at the rate of 2° C. per minute up to 400° C. followed by heating in argon at 1400° C. at the rate of 10° C. per minute.

EXAMPLE—19

5 gms. of phenolic resin is mixed with 7.5 gms of methanol and 1.42 gms of hexamine and stirred. Jute fibre is dried at 65° C. for 1.5 hr. and is impregnated with the above solution and formed into a composite plate. The composite plate is dried at a temperature of 80° C. followed by curing at a temperature of 170° C. for 3 hrs. The plate is then impregnated with eithylorthosilicate under vacuum. The vacuum impregnation step is repeated for 4 cycles. The material so obtained is heat treated in argon at the rate of 3° C. per minute up to 350° C. followed by heating in argon at 1500° C. at the rate of 10° C. per minute.

EXAMPLE—20

9 gms. of phenolic resin is mixed with 15 gms of methanol and 3.5 gms of hexamine and stirred. Jute fibre is dried at 90° C. for ½ hr. and is impregnated with the above solution and formed into a composite plate. The composite plate is dried at a temperature of 80° C. followed by curing at a temperature of 160° C. for 20 hrs. The plate is then impregnated with eithylorthosilicate under vacuum. The vacuum impregnation step is repeated for 5 cycles. The material so obtained is heat treated in argon at the rate of 20° C. per minute up to 400° C. followed by heating in argon at 1750° C. at the rate of 10° C. per minute.

EXAMPLE—21

4.5 gms of phenolic resin is mixed with 7.5 gms of methanol and 1.68 gms of hexamine and stirred. Jute fibre is dried at 60° C. for 1 hr. and is impregnated with the above solution and formed into a composite plate. The composite plate is dried at a temperature of 80° C. followed by curing at a temperature of 160° C. for 20 hrs. The plate is then impregnated with eithylorthosilicate under vacuum. The vacuum impregnation step is repeated for 5 cycles. The material so obtained is heat treated in argon at the rate of 2° C. per minute up to 400° C. followed by heating in argon at 1700° C. at the rate of 10° C. per minute.

The main advantages of the present invention are:
1. Processing steps are reduced to a large extent.
2. Natural fibres of plant origin are used that replaces hazardous synthetic raw materials.
3. The constituents like silicon carbide whiskers and short fibres are formed in situ during the processing of the composite thereby eliminating the need for handling these components which are a potential health hazard.
4. Conventional composite fabricating techniques can be used thereby allowing easy formation of material with different microstructure and properties.

We claim:

1. A process for making in-situ carbide in the form of particulate, whiskers and fibres in an inorganic composite matrix, which comprises, dissolving 38 to 73.5 Wt %—of phenolic resin in an organic solvent to obtain a phenolic resin solution, adding 4.2–11.0 Wt % of a curing agent optionally adding 9.4–12 Wt % of silicon carbide powder to obtain a resin mix followed by impregnating 1.6–6.5 Wt % of natural fibre with the said resin mix dried at 60°–70° C. for a period in the range of 1–5 hrs. to obtain a dough in the form of a composite plate sheet, drying the said composite plate or sheet at a temperature in the range of 70°–90° C. for a time period in the range of 1–2 hrs., drying the composite plate or sheet, heat treating the dried composite plate or sheet at a temperature in the range of 150°–200° C. for a period in the range of 1–2.5 hrs., impregnating the resultant composite plate or sheet with 10.4–42 Wt % tetraethyl orthosilicate in vacuum, subjecting the impregnated composite plate/sheet to heat treatment in absence of air initially at a heating rate in the range of 2°–5° C. per minute up to a temperature in the range of 200°–400° C. followed by further heating at the rate of 10°–15° C. per minute up to a temperature in the range of 1400° C.–1850° C., maintaining the final temperature for a period in the range of 0.5–2 hrs.

2. A process as claimed in claim 1 wherein the natural fibre introduced in the body in desired alignment is selected from unidirectional, multidirectional, woven, and randomly oriented structure.

3. A process as claimed in claim 1 wherein the matrix material used is of different particle dimension ranging from nano to micron size.

4. A process as claimed in claim 1 wherein the heat treatment is done in an inert atmosphere or in vacuum.

* * * * *